Patented Feb. 5, 1952

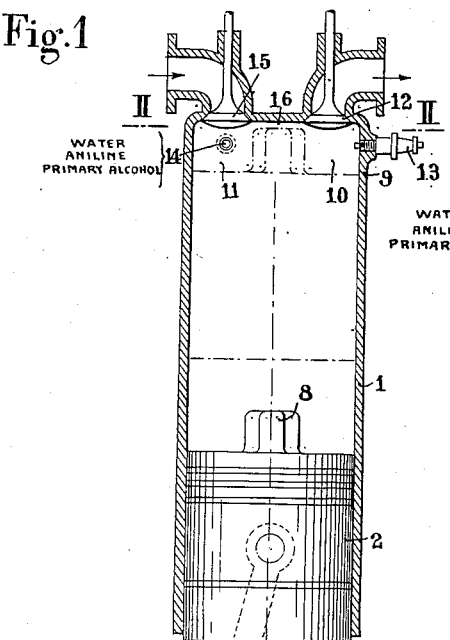
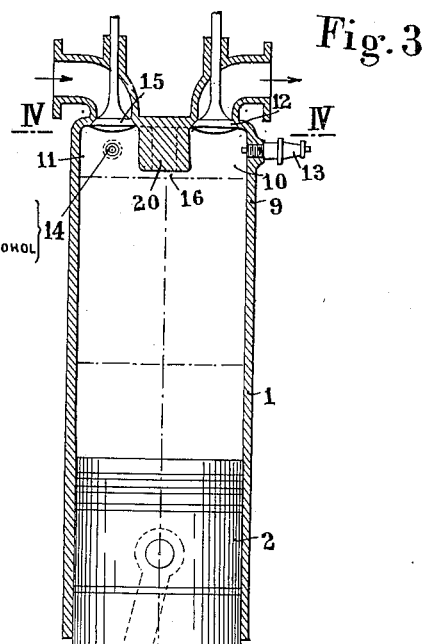
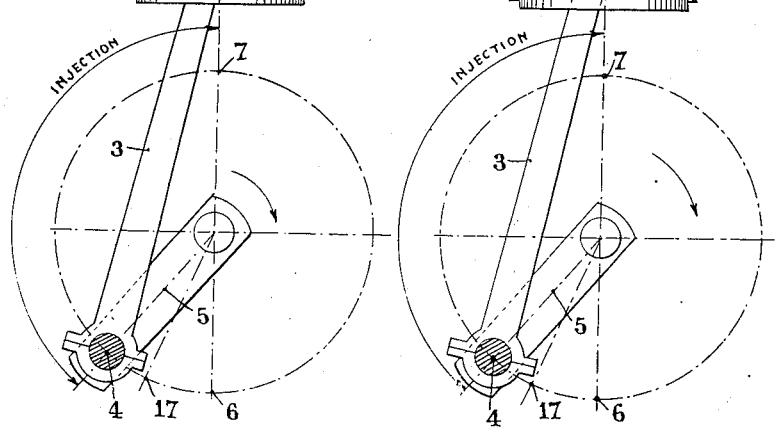
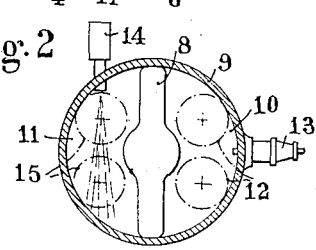
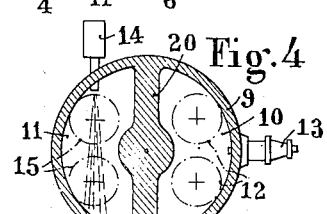

2,584,560

UNITED STATES PATENT OFFICE 2,584,560

METHOD OF COOLING EXPLOSION ENGINES

Albert Alexandre Augustin Darche,
Bondy, France

Application January 17, 1948, Serial No. 2,890
In France August 2, 1946

Section 1, Public Law 690, August 8, 1946
Patent expires August 2, 1966

4 Claims. (Cl. 123—25)

In order that the injection of water or of an aqueous fuel in explosion engines may lead to optimum results, the said injection has to comply with a number of requirements and notably:

1. The water should be used in the liquid state in order that maximum effect can be obtained with the least possible amount.
2. The amount of water injected into the engine should be varied in direct dependency on the load and limited to what is strictly necessary for the preclusion of pinking.
3. The injection should be timed in dependency on the load and on the speed of the engine.

These various requirements which characterize the method proposed by the applicant can be fulfilled by the use of suitable devices and particularly of injection pumps enabling to effect the necessary adjustments.

As an application of these principles this invention aims at decreasing the pressure to which the mixture is subjected at the end of the combustion process and above all at quite considerably lowering the temperature of that fraction of the charge which is to burn last.

According to the invention, this twofold result is obtained:

1. By isolating in a separate auxiliary chamber that fraction of the charge which is to burn last and
2. By injecting water or an aqueous liquid into the said auxiliary chamber so as to limit the effects of such an injection to that fraction of the charge which is to burn last.

Consequently, according to the invention, water or some other aqueous liquid is sprayed in controlled amounts into a separate auxiliary combustion chamber which communicates with the main chamber in which ignition takes place.

The vaporization of the water sprayed in absorbs a considerable amount of heat and results in a cooling and a contraction of the mixture in the auxiliary chamber. At equal pressures the density of the mixture in the latter is much higher. During the compression stroke a portion of the charge that otherwise would have been retained and compressed in the main chamber is forced into the auxiliary chamber in an amount that is directly dependent on the amount of water sprayed in. The invention thus makes it possible without resorting to any mechanical contrivance to obtain a variable-ratio adiabatic compression in the main chamber, whereby one is enabled in wide limits to control the pressure at the end of the compression stroke. For instance, it is possible to increase the intake pressure of an engine by 70% while the pressure at the end of the compression stroke remains unchanged.

Preferably, the injection into the auxiliary chamber begins only after the actual beginning of the compression, that is, after the intake valve is closed.

The injection may go on during a portion of the combustion process.

As already stated, the time at which the injection begins is preferably dependent on the load or at any rate on the engine speed.

Generally, it will be preferable to set the injector in alignment with the longitudinal axis of the auxiliary combustion chamber.

The main combustion chamber may communicate with the auxiliary chamber at any point of the latter. As a rule, where this is consistent with the design of the engines the former will open in the latter preferably at that end thereof which is remote from the injector.

However, the spray may also be caused to act crosswise upon a portion of the gas stream.

It will be appreciated easily that while on one hand a parallel increase of pressure occurs in the main chamber and the auxiliary chamber during the compression period on the other hand a considerable difference exists between the temperatures attained.

The compression of the charge in the main chamber is substantially adiabatic whereas in the auxiliary chamber an approximately isothermic compression may be aimed at, and this, not only during the compression process due to the displacement of the piston but also during the rapid compression to which the still unburned portion of the charge is subjected by the expansion of the burning gases.

As the flame reaches the mixture present in the auxiliary chamber the temperature of said mixture is considerably lower than the temperature that would have been attained in the absence of any injection. As already stated, the effects of the injection are the more considerable as they are concentrated on a limited portion of the mixture.

Moreover, it is possible to use very large amounts of water, for instance twice as much as the weight of fuel injected, without exerting any delaying action upon the starting of the engine or upon the time at which combustion begins in the main chamber. If a sufficient amount of water or hydrated liquid is injected, a portion of water remains in the state of mist and is only vaporised in the immediate vicinity of the flame.

This flame having to furnish the important heat necessary for the vaporisation, its speed of propagation is strongly diminished.

For water alone there may be substituted mixtures of the same with a primary alcohol. An example of such a mixture is the following one, the percentages being by volume.

| | Per cent |
|---|---|
| Water | 50 |
| Methanol | 50 |

Likewise, a mixture of water with aniline made miscible by the addition of at least one primary alcohol is suitable. The following is an example of such a mixture in which the percentages are by volume.

| | Per cent |
|---|---|
| Butanol | 10 |
| Ethanol | 10 |
| Methanol | 24 |
| Aniline | 6 |
| Water | 50 |
| | 100 |

Irrespective of whether water is used alone or in mixture, the considerable anti-pinking effect secured makes it possible either to use a higher compression ratio or to increase the intake pressure, or to combine an increased compression ratio with an increased intake pressure.

More particularly, as far as airplane take-off is concerned, it becomes possible to attain a high supercharging ratio and thus to considerably increase the power of the engine.

It seems quite feasible to get 200 H. P. from a 4-liter charge cylinder and thus to develop with a 36-cylinder engine more than 7,000 H. P.

Where the intake and the exhaust valves are arranged above the piston (which generally is the case with airplane engines) a comparatively simple way of providing two separate combustion chambers consists in providing a vertical partition designed to divide the clearance between the cylinder head and the piston top into two compartments.

Such a division may be achieved by providing the piston at its top side with a web-like projection, or conversely the inside of the cylinder head with a similar downwardly-extending web-like projection.

In the annexed drawing Figure 1 which is a diagrammatical section of an engine cylinder, shows the piston provided with a web-like projection;

Fig. 2 is a sectional view on the line II—II of Fig. 1;

Fig. 3 is a diagrammatical section of an engine cylinder showing on the cylinder head a projection forming a separating wall;

Fig. 4 is a sectional view on the line IV—IV of Fig. 3.

The embodiment of Figs. 1 and 2 comprises an engine cylinder 1 in which is reciprocated a piston 2 connected as usual by a connecting rod 3 to a crankshaft 5. When the piston 2 is at the end of its downward stroke, the crankpin of the crankshaft is at 6, and when the piston is at the end of its upward stroke in the position shown in dot and dash lines in Fig. 1, the crankpin of the crankshaft is at 7, in a position diametrically opposite the point 6 with relation to the axis of the crankshaft 5. The piston 2 is provided with a web-like projection 8, which, when the piston is at the end of its upward stroke, divides the clearance between the piston 2 and the cylinder head 9 into two distinct combustion chambers 10 and 11, in which combustion takes place when the piston has compressed in said chambers the carburetted mixture which was introduced during the suction stroke.

The chamber 10, in which the combustion is initiated and which acts as a "hot chamber," contains the exhaust valves 12 and the igniter plug 13. The latter may be duplicated, this being the usual practice in airplane engines.

The nozzle 14 through which water or a liquid hydrated fuel is sprayed in opens into the chamber 11 which contains the intake valves 15 and in which the combustion is completed and which acts as the "cold chamber."

For the time the piston is moving adjacent to its top dead center the chambers 10 and 11 communicate with each other through that narrow passage 16 which remains free between the cylinder head 9 and the top edge of the web-like partition 8.

As shown in Fig. 2 the sectional shape of the partition 8 on piston 2 is such that the normal motion of the intake valves 15 and of the exhaust valves 12 shall not be interfered with; said valves are outlined in dash-and-dot lines in Fig. 2.

The nozzle 14 is so directed that the spray therefrom will pass through the auxiliary chamber 11 lengthwise of the same.

When after a downward suction stroke the piston 2 has reached a position corresponding to the position 6 of the crankpin of the crankshaft 5, the piston 2 moves upwardly in the cylinder 1, and when the crankpin has reached a position 17, the intake valves 15 are brought in their closed position and then begins the compression of the carburetted mixture in the cylinder 1. After the intake valves are closed, and when the piston has reached a position corresponding to the position 4 of the crankpin as shown in Fig. 1, water or a hydrated fuel, for instance a mixture of water, aniline and a primary alcohol, is injected into the cold chamber 11. This injection may be continued during the whole compression stroke, i. e. until the piston 2 is at the end of its upward stroke. Said injection cools the mixture in the chamber 11 and increases the density in said chamber, with the result that during the compression stroke, the proportion of gaseous mixture compressed in chamber 11 will increase; the water or hydrated fuel injected at 14 will remain in said chamber 11, whilst the mixture in chamber 10 will remain water free. When the igniter plug 13 has produced the ignition spark, combustion begins in the water free chamber 10 and is continued in the chamber 11 in which the mixture is cooled and contains water. As already stated, the injection of water may be continued during part of the combustion stroke.

The embodiment of Figures 3 and 4 is analogous to the one of Figures 1 and 2, except that in the embodiment of Figures 3 and 4 the two chambers 10 and 11 are separated by a wall 20 formed by a projection on the inner face of the cylinder head 9. The other elements are the same as in the embodiment of Figures 1 and 2 and the operation is identical in both cases.

Without departing from the scope of the invention it will be possible to make all such modifications in it as will not alter its principle.

What I claim as new is:

1. A method of using an aqueous liquid in internal combustion engines in which the combustion chamber is divided into a main combustion chamber provided with ignition means and an auxiliary chamber communicating with said main chamber which consists in introducing in the course of the suction stroke carburetted air through the auxiliary chamber into the engine cylinder, said carburetted air being thus led indirectly into the main chamber, and after the end of the suction stroke and during at least part of the compression stroke injecting an aqueous liquid into the auxiliary chamber with the result that it is retained therein by the compression pressure and that the carburetted mixture in the main chamber is free from any aqueous liquid, so that as the mixture is ignited in the main chamber the combustion will begin in the said main chamber that contains carburetted air and is completed in the said auxiliary chamber that contains a mixture of carburetted air with water.

2. A method of using an aqueous liquid in internal combustion engines according to claim 1 wherein the amount of water injected into the auxiliary chamber is variable, so that the percentage of carburetted mixture forced into the main chamber during the compression stroke is made dependent on the amount of water injected, which makes it possible to control the pressure obtained at the end of the compression stroke.

3. A method of using an aqueous liquid according to claim 1 wherein the aqueous liquid is composed of water, aniline and a primary alcohol.

4. In an internal combustion engine, a cylinder, a piston guided in said cylinder, a combustion chamber delimited between the piston and the cylinder head and located completely in alignment with the piston, a partition dividing the combustion chamber into an auxiliary chamber and a main chamber and constituted by a web-like projection on the top side of the piston, at least one intake valve movable in the auxiliary chamber and at least one exhaust valve movable in the main chamber, said web-like projection being so designed that the intake and exhaust valves can move freely, ignition means communicating with the main combustion chamber and means to inject water into the auxiliary chamber.

ALBERT ALEXANDRE AUGUSTIN DARCHE.

REFERENCES CITED

The following references are of record in the file of this patent:

UNITED STATES PATENTS

| Number | Name | Date |
|---|---|---|
| 1,197,546 | Rogers | Sept. 5, 1916 |
| 2,191,746 | Barkeij | Feb. 27, 1940 |